Patented Oct. 7, 1952

2,613,162

UNITED STATES PATENT OFFICE 2,613,162

COATING COMPOSITIONS CONTAINING ALUMINUM ALCOHOLATES AS DRIERS

Herbert Walter Chatfield, Croydon, England, assignor to Leon Frenkel Limited, London, England, a company of Great Britain No Drawing. Application January 26, 1949, Serial No. 73,007. In Great Britain January 30, 1948

3 Claims. (Cl. 106—264)

This invention relates to coating compositions based on vegetable or animal drying oils.

In British Specification No. 573,083 it has been disclosed that products obtainable by reacting together an aluminium alcoholate derived from a lower monohydric alcohol containing up to 6 carbon atoms in the molecule and an aluminium phenate derived from phenol or a homologue thereof, or the reaction product obtained by heating together aluminium, a lower monohydric alcohol and a phenol are compatible with an oil, such as linseed oil, and increase the rate of drying of the latter.

It has now been found that valuable coating compositions can be obtained by incorporating therein a drying oil and the product obtained by reacting aluminium with an alcohol containing more than six carbon atoms, the reaction being effected by a method substantially similar to that described by Seligman and Williams in the Journal of the Society of Chemical Industry Volume 37, page 159 T, 1918.

Accordingly, the invention provides a coating composition based on a drying oil and incorporating an aluminum alcoholate whose alcohol radical contains more than six carbon atoms.

Preferably the additive to the drying oil is obtained by the reaction of aluminium on a saturated monohydric aliphatic alcohol, e. g. heptyl alcohol or octyl alcohol. The alcoholates from aluminium and monohydric alcohols containing more than 6 carbon atoms in the molecule are particularly stable and soluble products.

The temperature at which the reaction is effected is preferably between 100 and 200° C.

I have found that drying oils, especially oxidised, blown or partly polymerised drying oils, gel rapidly at ordinary air temperature when small quantities of the aluminium alcoholate are added to the drying oil. With natural untreated drying oils it is necessary to use somewhat larger quantities of the aluminium alcoholate and to apply heat in order to effect the rapid gelation.

Coating compositions based on drying oils in accordance with this invention gel or form films at much lower temperatures and/or in shorter times than untreated coating compositions. As a result of this it is possible to form an abnormally thick coating composition which can be applied to vertical or inclined surfaces without there being exhibited any noticeable tendency to flow or "run off" such surfaces. This is very advantageous from an economic view point in that considerable time is saved by being able to apply a single thick coat where, with other coating compositions, two coats would have been necessary. Furthermore, the coating compositions of the present invention based on blown or oxidised vegetable or animal oil are very rapid setting and it is, accordingly, possible to apply a second coating of the same material, if desired, within a few minutes of applying the first coating. The rapid gelling properties of a composition in accordance with the present invention is also of advantage in the preparation of linoleum.

The following example will illustrate the invention.

Example 130-lbs. of dry octyl alcohol are heated to 140° C. and 9-lbs. of dry aluminium turnings are gradually introduced. The viscosity of the mixture increases as the reaction proceeds and the temperature is raised gradually in order to facilitate completion of the reaction. About 7½-lbs. of a solution of this alcoholate comprising equal parts by weight of alcoholate and white spirit, incorporated with 25-lbs. of a thin blown linseed oil, yields a coating composition which gels very much more rapidly than a composition comprising merely linseed oil and white spirit.

Instead of employing the reaction product from octyl alcohol and aluminium, the alcoholate derived as above from 116-lbs. of dry heptyl alcohol and 9-lbs. of dry aluminium turnings may be employed in the compositions of the invention.

Further advantageous properties of the compositions in accordance with the present invention are that such compositions show a substantially reduced tendency, as compared with untreated compositions, to penetrate into absorbent surfaces, for example, paper and wood; drying oils containing the aluminium alcoholate have an appreciably increased viscosity as compared with untreated drying oils.

What I claim is:

1. A rapid setting coating composition consisting essentially of a drying oil and a minor proportion of an aluminum alcoholate selected from the group consisting of heptyl and octyl alcoholates in amount sufficient to produce rapid setting.

2. A rapid setting coating composition as claimed in claim 1 in which the drying oil is selected from the group consisting of blown and oxidized drying oils.

3. A composition as set forth in claim 2 in which the amount of alcoholate is about 15% by weight of the drying oil.

HERBERT WALTER CHATFIELD.

REFERENCES CITED

The following references are of record in the file of this patent:

UNITED STATES PATENTS

| Number | Name | Date |
|---|---|---|
| 2,229,528 | Shoemaker | Jan. 21, 1941 |
| 2,292,205 | Denison et al. | Aug. 4, 1942 |